INVENTOR.
SAMUEL T. KELLY
BY
Caudr & Caudr
HIS ATTORNEYS

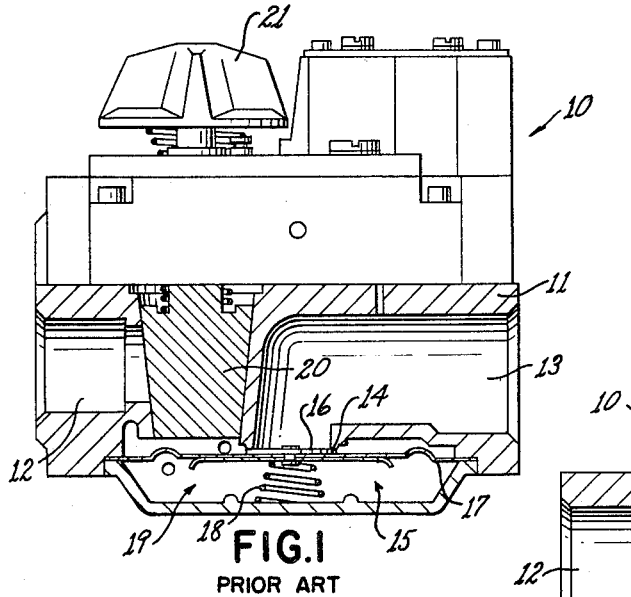
FIG.1 PRIOR ART
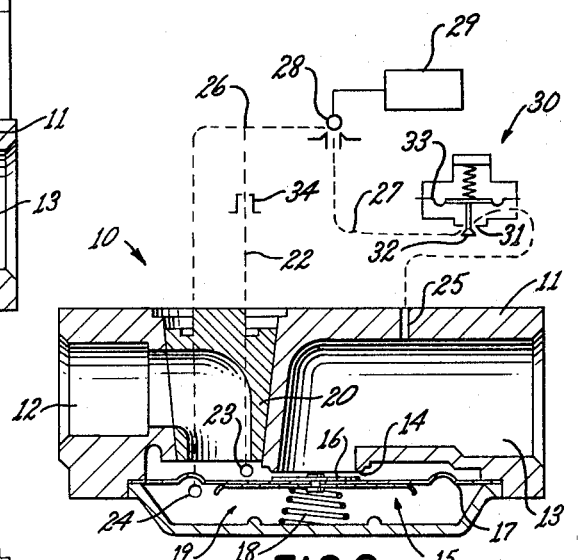
FIG.2 PRIOR ART
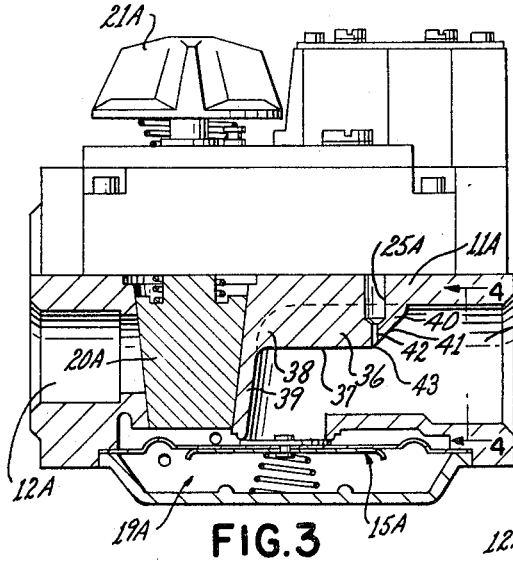
FIG.3
FIG.4
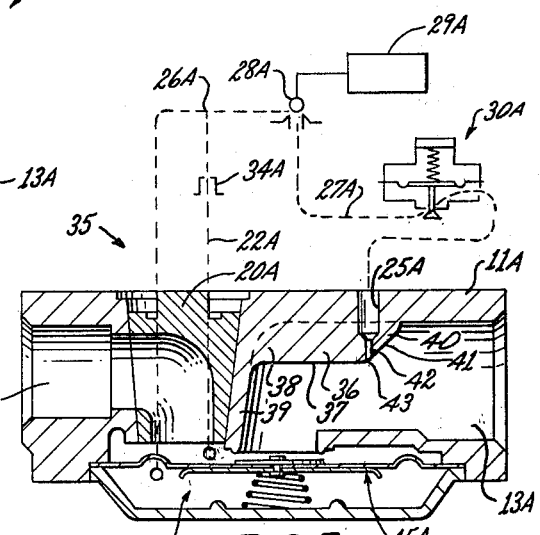
FIG.5
INVENTOR.
SAMUEL T. KELLY
BY
Caudr & Caudr
HIS ATTORNEYS June 18, 1968  S. T. KELLY  3,388,717
CONTROL MEANS HAVING OUTLET PRESSURE SENSING MEANS
Filed Feb. 12, 1964  3 Sheets-Sheet 3

United States Patent Office 3,388,717
Patented June 18, 1968

3,88,717
CONTROL MEANS HAVING OUTLET PRESSURE
SENSING MEANS
Samuel T. Kelly, Torrance, Calif., assignor to Robertshaw Controls Company, Richmond, Va., a corporation of Delaware
Filed Feb. 12, 1964, Ser. No. 344,470
4 Claims. (Cl. 137—484.2)

This invention relates to an improved means for sensing the pressure of fluid flowing through an outlet passage means.

It is well known that various control systems utilize the sensing of the pressure of the fluid in an outlet passage means of the system to control various regulating devices of the system.

For example, in a water heater control or the like, an inlet passage means is interconnected to an outlet passage means by a valve seat that is controlled by a pressure regulator so that the proper pressure will be provided at the outlet passage means.

In addition, means are provided for sensing the pressure of the fluid flowing through the outlet passage means in a manner to increase the flow through the pressure regulator at higher flows than similar controls not utilizing the sensing of the outlet pressure. The controls which sense the pressure value of the fluid flowing through the outlet passage means has the advantage of being applicable to higher capacity gas appliances without a corresponding increase in size and main gas porting of the control device.

In such control devices which have the diaphragm valve and pressure regulator or the standard pressure regulator, the outlet pressure sensing may be sensed directly on the regulator diaphragm or through porting which feeds the sensed pressure to the diaphragm.

The pressure so sensed is a dynamic pressure, essentially static but influenced by the velocity of flow. The sensed pressure under dynamic conditions is inversely proportional to the velocity of flow at the point of sensing with the sensing point perpendicular to or facing downstream from the direction of flow. Proper sizing, positioning in respect to velocity patterns and orientation in respect to direction of flow can be used to vary the sensed pressure at such point.

However, according to the teachings of this invention, an improved means for sensing the pressure value of the fluid flow in the outlet passage means of such control devices is provided by this invention.

Accordingly, it is an object of this invention to provide an improved outlet pressure sensing means having one or more of the novel features set forth above or hereinafter shown or described.

Other objects, uses and advantages of this invention are apparent from a reading of this description, which proceeds with reference to the accompanying drawings forming a part thereof and wherein:

FIGURE 1 is a partial cross-sectional view of a prior art control device.

FIGURE 2 is a view similar to FIGURE 1 and illustrates the system of the control illustrated in FIGURE 1.

FIGURE 3 is a view similar to FIGURE 1 and illustrates the improved control device of this invention.

FIGURE 4 is a fragmentary cross-sectional view taken on line 4—4 of FIGURE 3.

FIGURE 5 is a view similar to FIGURE 2 and illustrates the control system of the control device of this invention.

Figure 6:
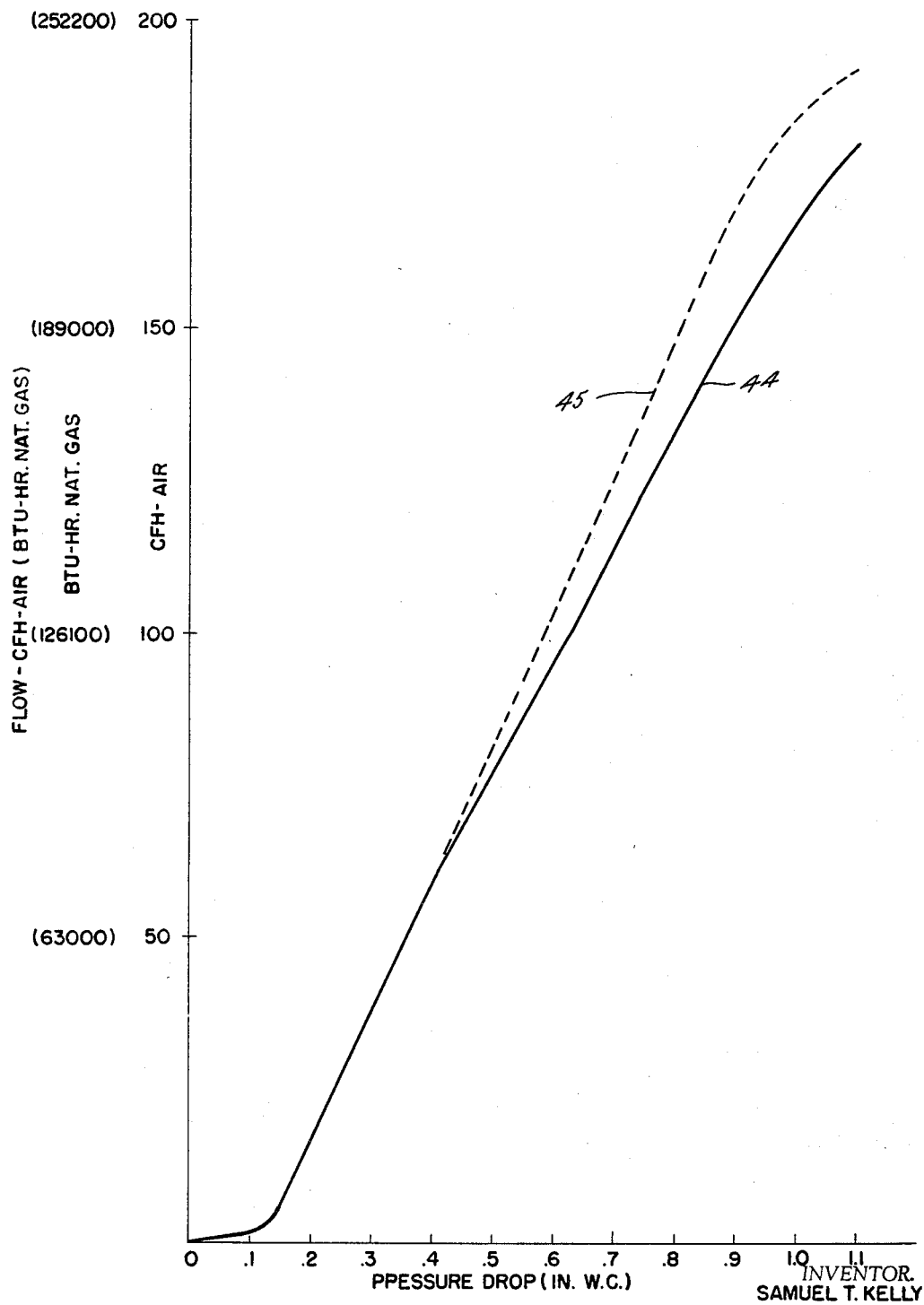
FIGURE 6 is a graph illustrating the comparison between the prior art control device of FIGURE 1 and the control device of this invention illustrated in FIGURE 3 under like conditions.

While the various features of this invention are hereinafter described as being utilized in a particular control system for a water heater control or the like, it is to be understood that the various features of this invention can be utilized singly or in any combination thereof to provide port sensing at an outlet passage means of any desired control system or control device.

Therefore, this invention is not to be limited to only the embodiments illustrated in the drawings because the drawings are merely utilized to illustrate one of the wide variety of uses of this invention.

Referring now to FIGURES 1 and 2, a prior are control device is generally indicated by the reference numeral 10 and is adapted to control the flow of fuel to a burner means of a water heater tank or the like, the details of the prior art device 10 now to be described in order to understand the important advantages provided by the invention hereinafter set forth.

As illustrated in FIGURES 1 and 2, the control device 10 includes a housing 11 having an inlet passage means 12 and an outlet passage means 13 respectively interconnected together by a valve seat 14 opened and closed by a pressure regulator means 15, the pressure regulator means 15 including a valve member 16 carried by a flexible diaphragm 17 normally urged to the closed position by a compression spring 18 and defining a chamber 19 with the housing means 11 for a purpose hereinafter described.

A plug valve 20 is carried by the housing means 11 and normally closes the inlet passage means 12 from the pressure regulator 15 under the influence of the positioning of a control knob 21 in a manner conventional in the art.

As illustrated in FIGURE 2, the housing means 11 has a bleed line passage means 22 leading from an inlet port 23 to an outlet port 24, the inlet port 23 being in communication with the inlet passage means 12 downstream from the plug valve 20 and the bleed line part 24 being in communication with the chamber 19 of the pressure regulator 15.

A bleed line outlet 25 is formed in the housing means 11 and interconnects the outlet passage means 13 with the bleed line passage means 22 at point 26 by a branch passage means 27 formed in the housing means 11.

An on-off valve 28 is disposed in the branch passage means 27 and is controlled by a regulator 29 in a conventional manner.

A sensing regulator 30 is also disposed in the branch passage means 27 intermediate the valve 28 and the bleed line outlet 25 and comprises a valve seat 31 adapted to be opened and closed by a poppet valve member 32 carried by a flexible diaphragm 33 in a conventional manner.

A restricting orifice 34 is disposed in the bleed line passage means 22 intermediate the bleed line inlet 23 and the juncture 26 of the branch passage means 27 with the bleed line passage means 22.

The operation of the prior art device 10 illustrated in FIGURES 1 and 2 will now be described.

Assuming that the plug valve 20 has been moved to its open position as illustrated in FIGURE 2 and that the appropriate pilot system for the water heater tank is ignited, fuel is adapted to flow from the inlet passage means 12 of the control device 10 through the pressure regulating valve means 15 to the outlet passage means 13 to provide fuel for the main burner means of the water heater tank when memebr 28 is in its opened position.

When the valve member 28 is disposed in its closed position, the valve member 16 is closed because it can be seen that the pressure fluid in the inlet passage means 12 of the control device 10 will be conveyed to the chamber 19 of the pressure regulator 15 by means of the bleed line passage means 22 whereby the force of the pressure fluid in the chamber 19 closes the valve member 16 in opposition to the force of the pressure fluid in the inlet passage means 12 pushing against the top side of the diaphragm 17 in a conventional manner.

However, if it is desired to have a burner output of the main burner of the water heater tank, the valve member 28 is moved to an opened position by the regulator 29 whereby the bleed line passage means 22 is now interconnected to the outlet passage means 13 by the branch passage means 27.

Under these conditions, a proportionate amount of fluid pressure in the bleed line passage means 22 is bled off therefrom to the bleed line outlet 25 whereby the pressure of the fluid in the chamber 19 of the pressure regulator 15 is proportionately reduced so that the valve member 16 will be moved to an opened position thereof to permit the fluid to flow through the valve seat 14 to the outlet passage means 13 whereby a burner output is provided for the water heater tank.

However, it is found that the pressure valve of the pressure fluid at the outlet 13 being sensed by the bleed line outlet 25 is a dynamic pressure that is essentially static but influenced by the velocity of the flow. This sensed pressure at the bleed line outlet 25 is inversely proportional to the velocity of flow at the point of sensing and since the port 25 is disposed adjacent the outer periphery of the outlet passage means 13, it is found that the velocity of flow in the area sensed by the port 25 is less than the velocity of the fluid flow at the center of the outlet passage means 13.

The feedback of this pressure at the bleed line oulet 25 to the sensing regulator 30 causes a partial closure of the valve member 32 thereof whereby this partial closure of the sensing regulator valve 30 causes a corresponding increase in the bleed line pressure in the bleed line 22 downstream from the restricting orifice 34.

The build-up in bleed line pressure in the bleed line passage means 22 after the restricting orifice 34 acts through the bleed line port 24 to proportionally increase the force of the pressure fluid in the chamber 19 to proportionally close the main valve member 16 whereby the desired increased fluid flow through the outlet passage means 13 is adversely affected by the pressure sensed at the bleed line outlet 25.

However, according to the teachings of this invention, it has been found that the housing means 11 of the control device 10 can be so modified in a manner hereinafter described that a higher flow through the outlet passage means 13 can be provided for the same sensed controlling pressure whereby the pressure drop capacity of the control is increased and the controlled outlet pressure is biased upwardly. This increases the flows at which a satisfactory outlet pressure can be maintained for higher capacity gas appliances without a corresponding increase in size and main gas porting of the control device.

In particular, reference is made to FIGURES 3–5 of the drawings wherein the improved control device of this invention is generally indicated by the reference numeral 35 and parts thereof similar to the control device 10 previously described are indicated by like reference numerals followed by the reference letter A.

As illustrated in FIGURES 3–5, the control device 35 and system of this invention is substantially the same as the control device 10 previously described except that the housing means 11A has an inwardly directed fin 36 formed integrally therewith and projecting toward the center of the outlet passage means 13A.

In particular, the fin 36 has a substantially rectangular cross-sectional configuration as illustrated in FIGURE 4 and has a lower surface 37 disposed substantially parallel to the longitudinal axis of the outlet passage means 13A.

The fin 36 has one end 38 thereof joined integrally with a vertically extending wall 39 of the housing means 11A and has the opposed end 40 thereof provided with an end surface 41 disposed angularly relative to the longitudinal axis of the outlet passage means 13A and generally facing in the direction of fluid flow through the outlet passage means 13A.

The bleed line outlet and pressure sensing port 25A of the control device 35 of this invention is formed directly through the fin 36 of the housing means 11A and has its outer end 42 formed at the innermost end 43 of the angled end surface 41 of the fin 36 as fully illustrated in FIGURES 3–5.

Therefore, it can be seen that the bleed line outlet and pressure sensing port 25A of this invention is adapted to sense the pressure of the fluid in the outlet passage means 13A substantially adjacent the center of the outlet passage means 13A whereby the pressure being sensed at the center of the outlet passage means 13A is substantially reduced over the pressure sensed by the bleed line outlet 25 of the control device 10 for the same rate of fluid flow through the outlet passage means 13A and 13 because the velocity at the center of the outlet passage means 13A and 13 is greater than adjacent the outer periphery thereof and because the sensed pressure is inversely proportional to the velocity of flow at the point of sensing when the sensing port is perpendicular to or facing downstream from the direction of flow.

Accordingly, it can be seen in FIGURE 5 of the drawings that the control device 35 of this invention is adapted to have an increased pressure drop capacity over the control device 10 illustrated in FIGURE 2 for the same inlet pressure value because the sensing port 25A of this invention senses a lower pressure than the port 25 whereby the sensing regulator 30A of this invention will not tend to close as much as the regulator 30 of the control device 10 for the same regulating capacities of the devices 35 and 10 whereby the pressure in the chamber 19A of the control device 35 of this invention will be less than the pressure in the chamber 19 of the control device 10 for the same settings of the two devices 35 and 10. Thus, the control device 35 of this invention will produce a higher burner rate than the control device 10 for the reasons set forth above.

Therefore, it can be seen that this invention provides an improved means for sensing the pressure at an outlet passage means of the control device whether the control device is formed in the manner set forth in the drawings or is utilized with other types of diaphragm and regulator controls in which a port in the control outlet channel is used for sensing outlet pressure.

For example, reference is now made to FIGURE 6 wherein a comparative graph is provided with the line 44 representing the prior art control device 10 and with the line 45 representing the control device 35 of this invention. Thus, it can be seen that for like conditions an increase of one inch WC pressure drop capacity of 17 c.f.h. of air is equivalent to approximately a 21,000 B.t.u. per hour capacity increase on natural gas by the control device 35 of this invention over the prior art control device 10.

Figure 7:
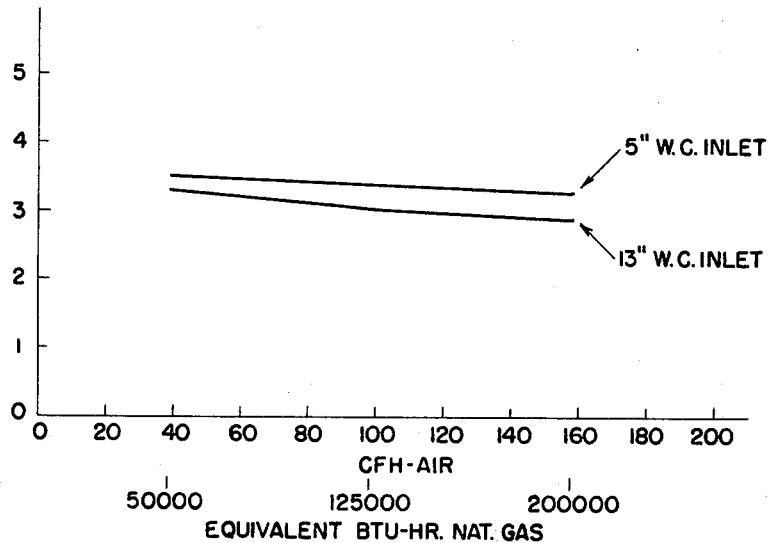
FIGURE 7 is a graph illustrating the decrease in outlet pressure experienced by the prior art control device of FIGURE 1 at increased WC settings thereof.
Figure 8:
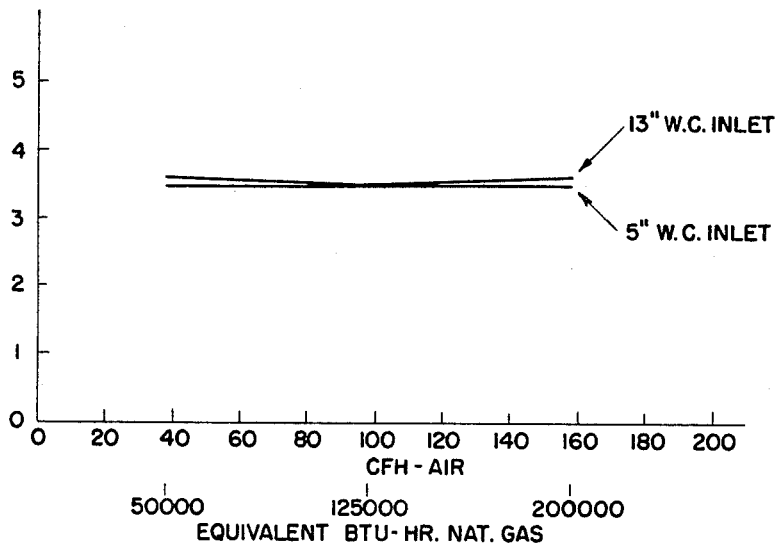
FIGURE 8 is a graph representing the substantial lack in decrease in outlet pressure of the control device of this invention illustrated in FIGURE 3 at higher flows of higher WC settings thereof.

Similarly, see the graphs illustrated in FIGURES 7 and 8 wherein the graph in FIGURE 7 represents the prior art control device 10 and the graph of FIGURE 8 represents the control device 35 of this invention under like conditions as the control device 10 whereby the regulated outlet pressure utilizing the control device 35 of this invention is maintained at or slightly above the 3.5 inch WC setting without the decrease in outlet pressure experienced at higher flows when the control device 10 is being utilized.

Thus, it can be seen that this invention provides an improved outlet pressure sensing means having distinct advantages over prior art devices.

While the form of the invention now preferred has been disclosed as required by the statutes, other forms may be used, all coming within the scope of the claims which follow.

What is claimed is:

1. In combination, an inlet passage means, an outlet passage means having a fin projecting toward the center of said outlet passage means, a pressure regulator means controlling the flow of fluid from said inlet passage means to said outlet passage means and having a chamber, bleed line passage means leading from said inlet passage means to said chamber, branch passage means leading from said bleed line passage means to a bleed line outlet means and passage means provided in said fin with the longitudinal axis of said bleed line passage means in said fin being substantially perpendicular to the fluid flow in said outlet passage means whereby said bleed line outlet means and passage means senses the pressure in said outlet passage means adjacent the center thereof, and a sensing regulator disposed in said branch passage means to control the fluid flow therethrough in response to the pressure sensed at said bleed line outlet means.

2. A combination as set forth in claim 1 wherein a restricting orifice is disposed in said bleed line passage means between said inlet passage means and said branch passage means.

3. A combination as set forth in claim 1 wherein said fin has an end surface angled relative to the longitudinal axis of said outlet passage means and said bleed line outlet means is provided near the innermost part of said end surface.

4. A combination as set forth in claim 3 wherein said end surface of said fin faces in the direction of fluid flow in said outlet passage means, wherein said end surface is disposed at an angle of approximately 45° relative to said longitudinal axis and wherein said fin has a straight end surface means parallel with said longitudinal axis of said outlet passage means with one end joining one end of said angled end surface means and with the other end flush with said means defining said outlet passage means.

References Cited

UNITED STATES PATENTS

| | | | |
|---|---|---|---|
| 2,137,025 | 11/1938 | Niesemann | 137—484.8 |
| 2,725,889 | 12/1955 | Biggle | 137—484.8 |
| 2,946,344 | 7/1960 | Mott | 137—484.8 |
| 3,122,160 | 2/1964 | Carr et al. | 137—484.2 |

FOREIGN PATENTS 11,214  1/1880  Germany.

M. CARY NELSON, *Primary Examiner.*

ARNOLD ROSENTHAL, *Assistant Examiner.*